US009677621B2

(12) United States Patent
Nickel et al.

(10) Patent No.: US 9,677,621 B2
(45) Date of Patent: Jun. 13, 2017

(54) FRICTION ASSEMBLY

(71) Applicant: Miba Frictec GmbH, Laakirchen (AT)

(72) Inventors: Falk Nickel, Gmunden (AT); Andreas Promberger, Ebensee (AT)

(73) Assignee: Miba Frictec GmbH, Laakirchen (AT)

( * ) Notice: Subject to any disclaimer, the term of this patent is extended or adjusted under 35 U.S.C. 154(b) by 71 days.

(21) Appl. No.: 14/831,513

(22) Filed: Aug. 20, 2015

(65) Prior Publication Data

US 2016/0053823 A1 Feb. 25, 2016

(30) Foreign Application Priority Data

Aug. 22, 2014 (AT) .............................. A 50580/2014

(51) Int. Cl.
*F16D 13/52* (2006.01)
*F16D 69/00* (2006.01)
(Continued)

(52) U.S. Cl.
CPC .............. *F16D 13/52* (2013.01); *F16D 55/36* (2013.01); *F16D 65/122* (2013.01); *F16D 69/00* (2013.01);
(Continued)

(58) Field of Classification Search
CPC .......... F16D 13/52; F16D 13/60; F16D 55/36; F16D 69/00; F16D 69/02; F16D 69/04; F16D 69/0408
See application file for complete search history.

(56) References Cited

U.S. PATENT DOCUMENTS 2,733,797 A * 2/1956 Almen .................... F16D 67/00
156/220
2,927,673 A 3/1960 Sand
(Continued)

FOREIGN PATENT DOCUMENTS

AT 510 943 A1 7/2012
DE 1 575 906 B 11/1970
(Continued)

OTHER PUBLICATIONS

Austrian Office Action in A 50580/2014, dated Jun. 10, 2015, with English translation of relevant parts.
(Continued)

*Primary Examiner* — Jacob S Scott
(74) *Attorney, Agent, or Firm* — Collard & Roe, P.C.

(57) ABSTRACT

The invention relates to an friction assembly (1) comprising a plurality of inner discs (2) and a plurality of outer discs (3), the inner discs (2) and the outer discs (3) being arranged alternately in an axial direction (4), and wherein between the inner discs (2) and the outer discs (3) respectively at least one freely rotational friction ring (11) is arranged, and wherein the inner discs (2) and/or the outer discs (3) can be adjusted relative to one another in axial direction (4) to form a frictional connection with the friction rings (11). The friction rings (11) are made from at least one resin, containing at least one additive, or a sintered material, wherein the friction rings (11) on a surface (19) facing an inner disc (2) and on a surface (18) facing an outer disc (3) comprise respectively at least one compacted area (20) and at least one non-compacted area (21) and/or at least one area (21) that is less compacted than the compacted area (20).

14 Claims, 6 Drawing Sheets

(51) Int. Cl.
*F16D 69/02* (2006.01)
*F16D 69/04* (2006.01)
*F16D 55/36* (2006.01)
*F16D 65/12* (2006.01)

(52) U.S. Cl.
CPC ............. *F16D 69/02* (2013.01); *F16D 69/04* (2013.01); *F16D 69/0408* (2013.01)

(56) References Cited

U.S. PATENT DOCUMENTS

| | | | |
|---|---|---|---|
| 3,073,424 A | 1/1963 | Russell | |
| 3,927,241 A | 12/1975 | Augustin | |
| 3,948,364 A | 4/1976 | Lowey | |
| 4,576,872 A | 3/1986 | Ward | |
| 5,176,236 A | 1/1993 | Ghidorzi et al. | |
| 5,373,928 A | 12/1994 | Werner et al. | |
| 6,006,885 A | 12/1999 | Borgeaud et al. | |
| 6,032,767 A | 3/2000 | Roeling | |
| 6,056,100 A * | 5/2000 | Adamczak | F16D 69/02 192/107 M |
| 6,105,234 A | 8/2000 | Kremsmair et al. | |
| 7,919,165 B2 * | 4/2011 | Hasegawa | F16D 13/64 106/36 |
| 8,083,046 B2 * | 12/2011 | Paterra | F16D 13/648 192/107 M |
| 8,746,427 B2 | 6/2014 | Foege et al. | |
| 2004/0050646 A1 * | 3/2004 | Matthes | F16D 13/648 192/107 R |
| 2005/0224310 A1 | 10/2005 | Li et al. | |
| 2006/0102443 A1 * | 5/2006 | Kinoshita | F16D 13/648 192/70.14 |
| 2013/0071628 A1 * | 3/2013 | La Forest | C04B 35/83 428/184 |
| 2013/0183478 A1 * | 7/2013 | Iwama | F16D 13/64 428/66.2 |
| 2013/0270059 A1 * | 10/2013 | Steinmetz | F16D 69/025 192/107 M |
| 2013/0288003 A1 | 10/2013 | Foege et al. | |
| 2015/0107951 A1 * | 4/2015 | Blough | F16D 13/64 192/3.28 |
| 2016/0053824 A1 * | 2/2016 | Nickel | F16D 13/648 192/107 M |

FOREIGN PATENT DOCUMENTS

| | | |
|---|---|---|
| DE | 2 340 464 B1 | 11/1974 |
| DE | 34 06 623 A1 | 8/1984 |
| DE | 38 01 911 A1 | 8/1988 |
| DE | 37 12 898 A1 | 11/1988 |
| DE | 42 06 321 A1 | 9/1993 |
| DE | 601 33 393 T2 | 4/2009 |
| DE | 10 2009 040 129 A1 | 4/2010 |
| DE | 10 2009 046 513 A1 | 6/2010 |
| EP | 0 267 027 A2 | 5/1988 |
| EP | 0 687 829 A1 | 12/1995 |
| EP | 0 790 426 A2 | 8/1997 |
| EP | 0 848 181 A1 | 6/1998 |
| EP | 1 464 857 A1 | 10/2004 |
| EP | 2 843 253 A2 | 3/2015 |
| FR | 2 774 731 A1 | 8/1999 |
| JP | H 0484832 U | 7/1992 |
| JP | H 11-230196 A | 8/1999 |
| WO | 9618049 A1 | 6/1996 |
| WO | 2004/025136 A1 | 3/2004 |

OTHER PUBLICATIONS

Austrian Office Action in A 50581/2014, dated Jun. 10, 2015, with English translation of relevant parts.

* cited by examiner

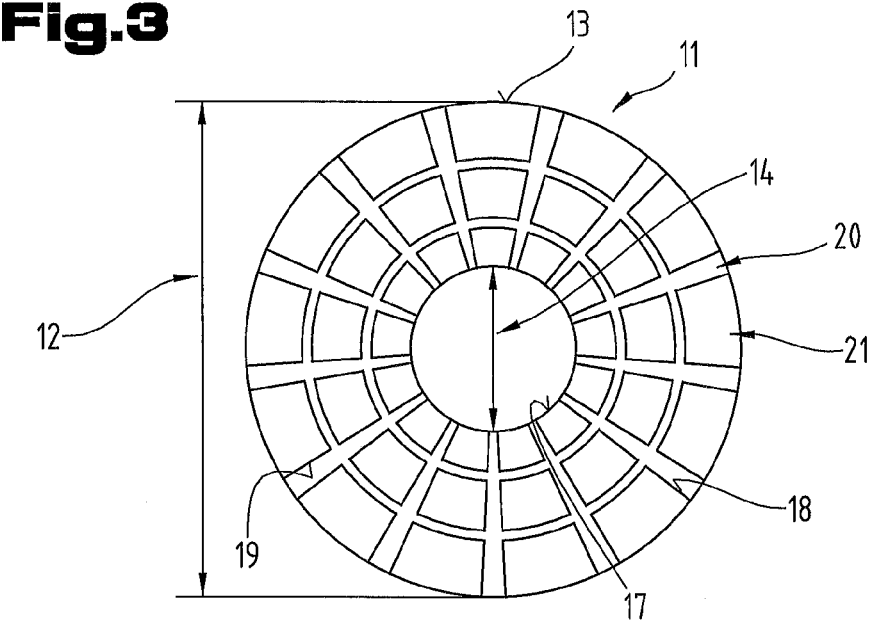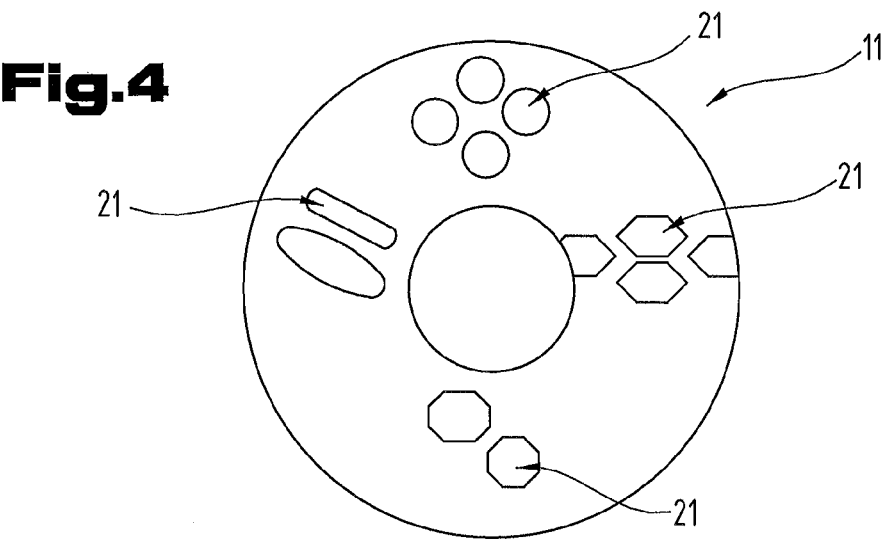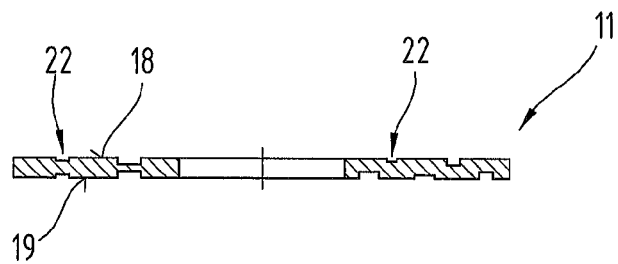

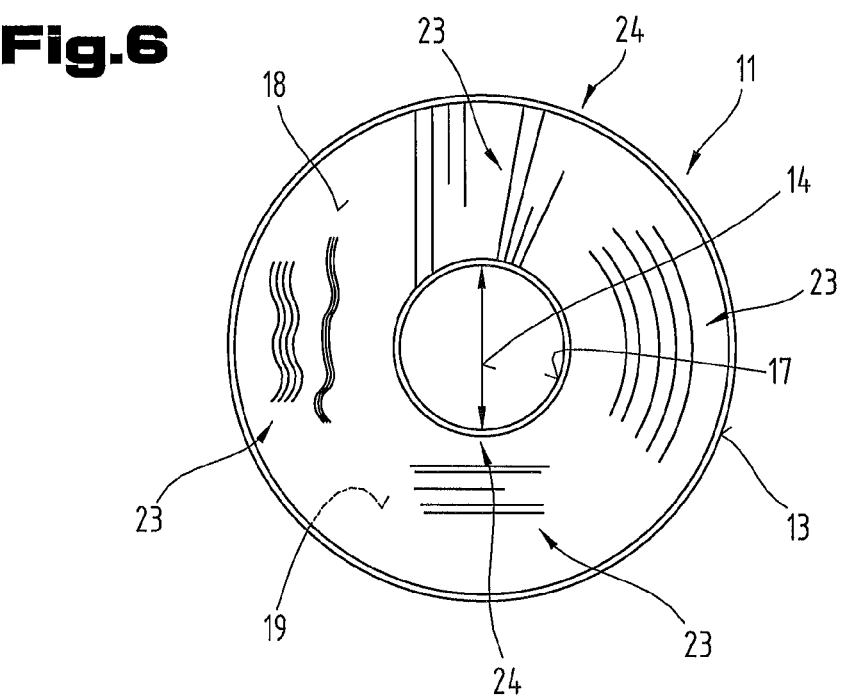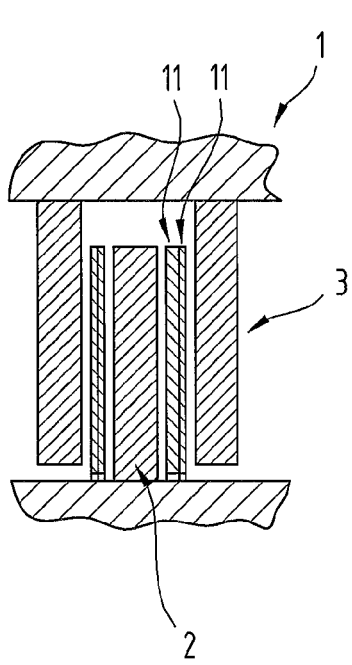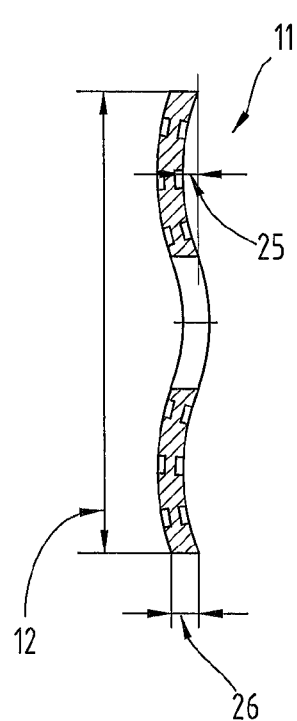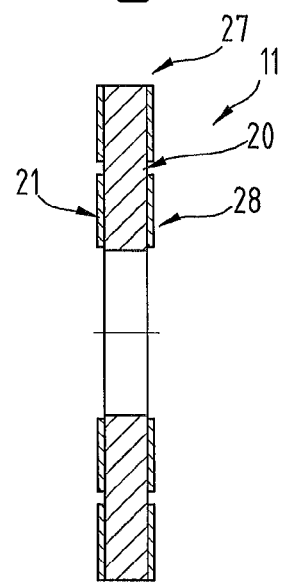

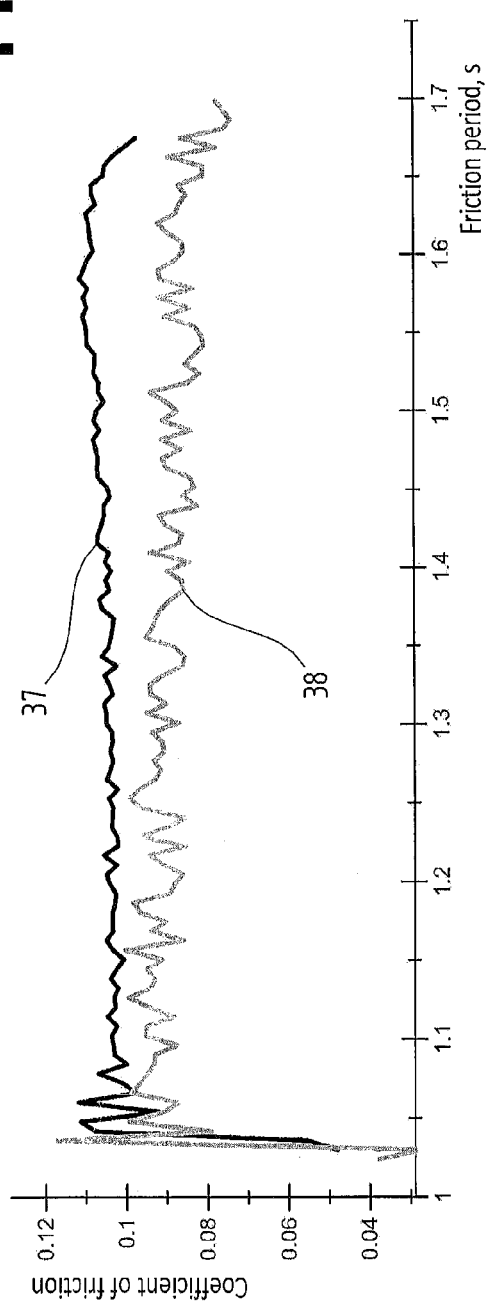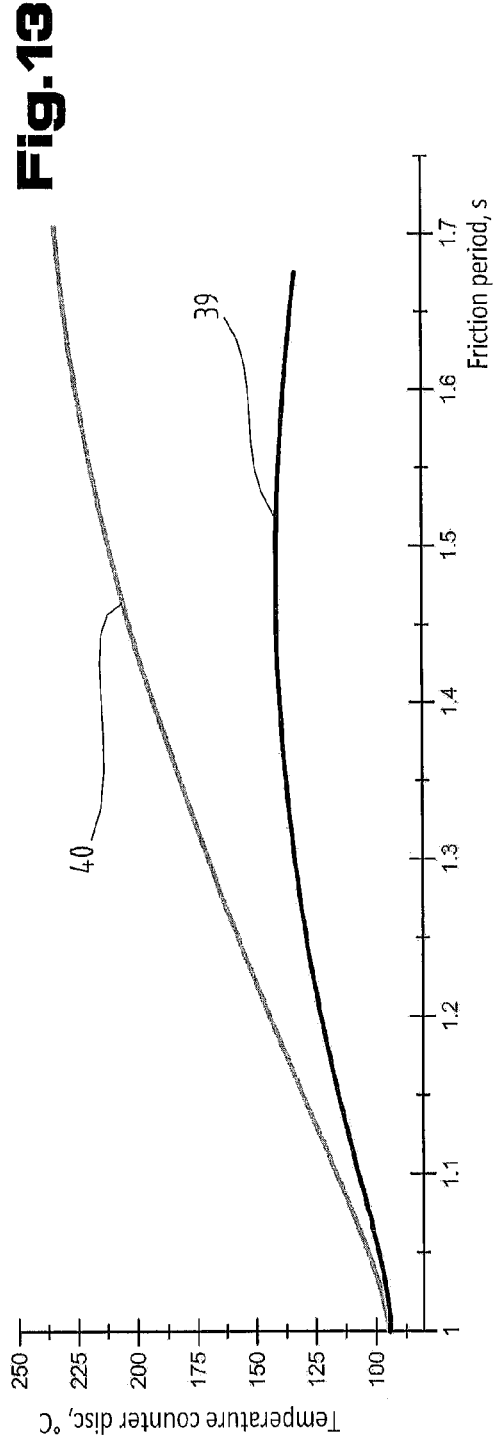

FRICTION ASSEMBLY

CROSS REFERENCE TO RELATED APPLICATIONS

Applicant claims priority under 35 U.S.C. §119 of Austrian Application No. A 50580/2014 filed on Aug. 22, 2014, the disclosure of which is incorporated by reference.

The invention relates to a friction assembly comprising a plurality of inner discs and a plurality of outer discs, wherein the inner discs and the outer discs are arranged alternately in axial direction, and wherein freely rotational friction rings are arranged between the inner discs and the outer discs, and wherein the inner discs and/or the outer discs are adjustable relative to one another in axial direction to form a frictional connection with the friction rings.

Multi-disc clutches and multi-disc brakes have already been described comprehensively in the prior art. The systems that are mostly used today comprise inner discs and outer discs which are arranged alternately in axial direction. The inner discs are arranged on an inner shaft and connected to the latter in a rotationally secure manner. The outer discs are arranged for example on an inner surface of a housing of the coupling and connected to the latter in a rotationally secure manner. To produce a frictional connection in the disc set the outer discs can be adjusted in axial direction relative to the inner discs—or vice versa. The frictional connection, which is necessary e.g. for torque transmission in the embodiment as a multi-disc clutch, is produced by friction linings. The friction linings are arranged either on the inner discs or the outer discs as separate friction linings and are connected to said discs in a rotationally secure manner.

In addition to said systems however systems have already been described in the prior art which comprise freely rotating rings or friction rings. In this case "freely rotating" means that the rings or friction rings are connected in a rotationally secure manner to an element of the clutch unlike the inner discs and the outer discs.

Thus for example DE 38 01 911 A1 describes an arrangement for a multi-disc clutch or multi-disc brake which are connected in a rotationally secure manner on their radially inner and outer edges alternately to a first and a second component and can be coupled together by inserting friction linings for a force-transmitting connection, wherein the friction linings are secured onto freely rotatably mounted support discs arranged between the discs.

DE 37 12 898 A1 describes a friction clutch for frictionally connecting a drive shaft to a driven shaft, comprising a first coupling body comprising a first coupling surface connected to the drive shaft, a second coupling body comprising a second coupling surface connected to the driven shaft, a friction body arranged between the coupling surfaces and an actuating element for pressing the coupling bodies together in the closed state of the friction clutch, wherein in the open state of the friction clutch the friction body is arranged loosely between the coupling surfaces. The outside diameter of the friction body is the same or slightly smaller than the inner diameter of the cylindrical inner surface of the gearbox housing, so that the friction body is thus arranged centrally in the gearbox housing and mounted in radial direction.

A similar multi-disc clutch is known from U.S. Pat. No. 6,006,885 A. The latter comprises freely rotating friction rings made from a carbon material which are guided on an inner surface of the outer discs.

FR 2 774 731 A1 also describes a multi-disc clutch with freely rotating friction rings arranged between the inner discs and the outer discs.

The underlying objective of the present invention is to improve a friction assembly of the aforementioned kind with respect to the freely rotating friction rings.

Said objective is achieved with the aforementioned friction assembly in that the friction rings are made from at least one resin, containing at least one additive, or from a sintered material, wherein the friction rings on a surface facing an inner disc and on a surface facing an outer disc each have at least one compacted area and at least one non-compacted area and/or at least one area that is less compacted than the compacted area.

It is an advantage that in this way the friction ring has greater mechanical strength over the at least one compacted area. This advantage outweighs the associated disadvantage that the area of the friction ring mainly available for the frictional connection is reduced, i.e. the at least one area that is not compacted or is less compacted. A positive secondary effect of this is that the compressibility of the friction ring can be adjusted more easily, whereby the frictional behavior of the friction ring itself can be better adjusted to the respective counter disc. By means of the improved mechanical stability a one-piece friction ring can be used without support, whereby the support has a long lifetime. It is also an advantage in this case that the friction ring can be produced with relatively high strength from only one material, wherein the friction ring can be produced more easily as the production process comprises fewer stages. By using only one material the homogeneity of the friction ring can be improved over its whole volume, i.e. the homogenous distribution of the individual components of the material. This in turn has a positive effect on the frictional behavior of the friction ring. By using only one material there is also no risk that when the fictional surface has been used the counter disc comes into friction with a metal support which would cause damage to the counter disc.

According to one embodiment variant of the friction assembly it is the case that at least some of the compacted areas annularly surround less compacted areas or non-compacted areas. It is thus possible to distribute the areas of greater strength over the surface of the friction ring more easily or it is possible vice versa to limit the area of the more compressible areas. In this way it is possible to achieve a better separation of the frictional surfaces during the transition to the opened state of the friction assembly. In addition, in this way the mechanical stability of the non-compacted or less compacted areas can be improved.

Preferably, the compacted areas are designed to be groove-like. This has the advantage, that the compacted areas can also be used additionally for guiding lubricant, whereby the friction ring can be cooled more effectively. In this way the proportion of non-compacted or less compacted areas on the surface of the friction ring can be increased, whereby the efficiency of the friction ring or the friction assembly can be improved.

At least the non-compacted or less compacted areas can have a porosity which is at least 20% and a maximum of 80%, relative to the total density of the material of the friction ring. The non-compacted or less compacted areas can thus have a greater compressibility. This can be used to increase the proportion of compacted areas on the total surface of the friction ring, whereby the mechanical stability of the friction ring can be improved.

According to one embodiment variant of the friction assembly the at least one compacted area on the surface facing the outer disc is offset in circumferential direction of the friction ring to at least one compacted area on the surface facing the inner disc. In this way the compressibility of the friction ring can be better adjusted to a desired degree. Furthermore, it is also possible that the compacted area of a surface supports more effectively the not compacted or less compacted area on the opposite surface of the friction ring, whereby the loadability of the friction ring can be improved.

In addition to improving the (mechanical) stability of the friction ring over the compacted areas to improve the stability of the friction ring it is possible that the at least one additive or at least one of the additives is formed by fibers, wherein at least 50% of the fibers, relative to the total amount of fibers in the friction ring, are oriented at least approximately in the same direction.

It is possible to arrange at least two friction rings between the inner discs and the outer discs respectively, whereby the friction rings are connected to one another. In addition to adjusting the compressibility of the friction ring by forming compacted areas it is also possible to influence the compressibility in this way.

According to one embodiment variant of the friction assembly the at least one additive or at least one of the additives can be formed by a wire-like reinforcing element, which is arranged in the region of a radially outer end face and/or in the region of a radially inner end face of the friction ring. In this way the stability of the friction ring can be improved further, whereby the proportion of compacted areas relative to the proportion of non-compacted or less compacted areas can be reduced. In this way, on the one hand the frictional behavior of the friction ring can be influenced, on the other hand in this way because of the greater proportion of not-compacted or less compacted areas on the surface of the friction ring the compressibility of the friction ring can also be adjusted in broad limits.

To reduce drag torques the friction ring can be designed to be wave-like. It is thus possible to reduce the proportion of compacted areas relative to the proportion of non-compacted or less compacted areas so that the efficiency of the friction ring can be improved.

Preferably, the friction ring has a thickness in axial direction which is selected from a range of 0.25 mm to 1.75 mm. If the friction ring is designed to be thicker than 1.75 mm it is possible to improve the mechanical stability of the friction ring, but it has been observed that a lining that is too thick can result in wobbling movements of the friction ring. Said wobbling movement in the opened state of the friction assembly can result in the contact of the friction ring with the surface of the counter disc, whereby the lifetime of the friction ring is reduced significantly. By providing compacted areas to increase the mechanical stability of the friction ring the thickness of the friction ring can be reduced in order to prevent this problem. A friction ring, which has a thickness of less than 0.25 mm, tends to wobble during operation which also reduces the lifetime of the friction ring.

Preferably, the non-compacted or less compacted areas each have an area of a maximum of 2 cm². On the one hand in this way the proportion of compacted areas on the total surface of the friction ring is increased whereby the mechanical stability can be improved. On the other hand it is also possible that the friction ring and counter disc can be separated more easily, as the sum of the areas which form the frictional connection with the counter discs of the friction set is lower and thus the adhesive friction is also reduced, whereby the problem of the friction ring "getting stuck" on the surfaces of the counter disc can be improved. A positive secondary effect can thus also be achieved in that because of the greater proportion of compacted areas on the friction ring, the cooling of the friction ring can be improved when the compacted areas are designed as grooves.

To improve the stability of the friction ring, in particular the mechanical loadability, it is possible that the ratio of an outside diameter to an inner diameter of the friction ring is at least 1.2.

According to another embodiment variant of the friction assembly the surface facing the outer disc and the surface of the friction ring facing the inner disc at least in the region of the non-compacted or less compacted areas has an arithmetic average roughness value Ra according to DIN EN ISO 4287:1998 of a maximum of 12.5 µm. At roughness values Ra of more than 12.5 µm the frictional effect could be improved but it was observed during tests that at roughness values Ra of more than 12.5 µm, the surface(s) of the friction ring became frayed despite the improved mechanical loadability because of the compacted areas in the region of the guide of the friction ring, finally resulting in the destruction of the friction ring.

It is possible for the friction rings to be guided internally on a shaft supporting the inner discs, whereby the distance between a surface of the shaft and the friction rings is at least 0.05 mm and a maximum of 3 mm. By means of the inner guide a greater degree of efficiency of the friction assembly can be achieved than with the external guide, whereby the improvement of the mechanical stability by the compacted areas combined with the inner guide have a positive effect. In order to avoid an increase in the temperature in the area of the friction rings it is an advantage if the distance between the shaft and the friction ring is at least 0.05 mm. If the distance is less than 0.05 mm the friction ring sits more tightly on the shaft, whereby the guiding is better but because of the relative movement of the shaft and friction ring more heat is created. Furthermore, a distance between the shaft and friction ring of more than 3 mm can result in walking movements of the friction ring, whereby the latter is subject to greater (mechanical) stress which can result finally in the destruction of the friction ring.

The aforementioned advantages of achieving the stability and at the same time compressibility of the friction rings can also be achieved in that according to one embodiment variant the friction rings are formed by a support ring and friction segments arranged thereon, whereby the support ring is made of paper. In this way the support ring can be more compacted than the friction segments. In addition, by means of this embodiment variant the cost of the friction ring can be reduced, in that expensive friction segments do need not be produced in one piece, whereby the amount of waste created with one-piece friction rings can be reduced. The friction rings thus consist of a supporting structure, namely the support ring, and a frictional structure, namely the friction segments.

For a better understanding of the invention the latter is explained in more detail with reference to the following Figures.

In a simplified, schematic representation:

FIG. 3 shows a first embodiment variant of a friction ring in a view of the frictional surface;

FIG. 4 shows various different embodiment variants of a friction ring with a view of the frictional surface;

FIG. 5 shows a friction ring in side view with compacted areas in the form of grooves;

FIG. 6 shows further embodiment variants of a friction ring in a view of the frictional surface with a preferred orientation of fibers;

FIG. 7 shows a section of an embodiment variant of the friction assembly in cross-section with more than one friction ring between the outer and inner discs;

FIG. 8 shows a wave-like friction ring in lateral cross section;

FIG. 9 shows a further embodiment variant of a friction ring in lateral cross section with a support element and friction segments arranged thereon;

FIG. 12 shows a graphical representation of the change of frictional values over time of friction rings;

FIG. 13 shows a graphical representation of the temperature of counter discs in friction assemblies;

Figure 1:
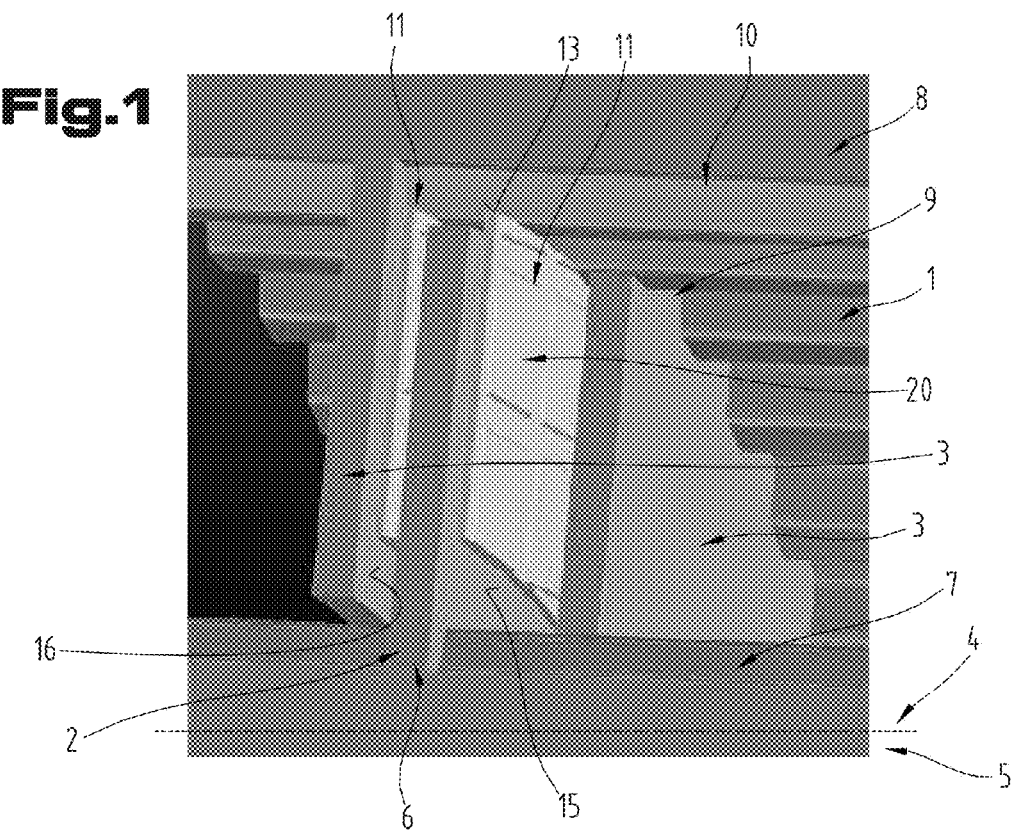
FIG. 1 shows a section of a friction assembly with external guiding in an oblique view.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIG. 1 shows a section of a first embodiment variant of a friction assembly 1 in perspective view. The friction assembly 1 comprises a plurality of inner discs 2 (only one is shown in FIG. 1) and a plurality of outer discs 3, wherein in an axial direction 4 of the friction assembly 1 the inner discs 2 and the outer discs 3 are arranged alternately, so that in axial direction 4 an inner disc 2 follows an outer disc 3 and is followed by an outer disc 3, etc.

Although FIG. 1 shows only an inner disc 2 and two outer discs 3 it should be noted that this number of discs is not considered to be restrictive. Rather, the friction assembly 1 can comprise for example between one and fifteen inner discs 2 and between one and fifteen outer discs 3. The exact number of inner discs 2 and outer discs 3 corresponds to the respective use of the friction assembly 1.

The friction assembly 1 is in particular a multi-disc clutch. However, it is also possible to design the latter as a multi-disc brake. Friction assemblies of this kind are known from the prior art, so that reference is made to further details, such as e.g. activating elements etc.

The inner discs 2 are connected in a rotationally secure manner to a first component 5, for example a shaft. In addition, the inner discs 2, which are designed in the form of circular ring discs, can have an internal toothing 6 on a radially inner end face that engages in an external toothing 7 of the first component 5. The inner discs 2, which have a corresponding opening, project over the first component 5 in radial direction and are fitted in particular onto the first component 5.

The outer discs 3 are connected in a rotationally secure manner to a second component 8, which is designed for example to be at least approximately sleeve-like. In addition, the outer discs 3, which like the inner discs 2 are designed as circular ring-like discs, can have an outer toothing 9 on a radially outer end face which engages in an internal toothing 10 on a radially inner surface of the second components 9. The outer discs 3 thus project from the inner surface of the second component 8 radially inwards in the direction of the first component 5. The outer discs 3 do not bear against the first component 5 but end at a distance from the latter. Likewise the inner discs 2 do not bear against the inner surface of the second component 8 but end at a distance from the latter.

At least one friction ring 11 is arranged between each inner disc 2 and each outer disc 3 so that the inner discs 2 are separated by the friction rings 11 from the outer discs 3 in axial direction 4 of the friction assembly 1.

For further details about the friction rings 11 reference is made to the following description.

Preferably, the inner discs 2 and the outer discs 3 are made of steel. However, they can also be made from another suitable material, in particular metal. The inner discs 2 and the outer discs 3 can be produced for example by punching, laser cutting or the like. Preferably, they have an arithmetic average roughness value Ra according to DIN EN ISO 4287:1998 of a maximum of 1 µm, in particular a maximum of 0.6 µm, if the friction rings 11 are made from a resin-bonded composite material, as explained further in the following, or have an arithmetic average roughness value Ra according to DIN EN ISO 4287:1998 of a maximum of 2 µm, in particular a maximum of 1.2 µm, if the friction rings 11 are made from a sintered material.

In the embodiment variant of the friction assembly 1 according to FIG. 1 the friction rings 11 are guided externally, i.e. externally centered. In addition, the also circular ring-like and at least almost disc-like friction rings 11 have an outside diameter 12 (FIG. 3) which is the same as or is slightly smaller than an inner diameter of the second component 8 in the region of a radially outer end face 13 of the friction rings 11. In the specific example embodiment of the friction assembly 1 according to FIG. 1 said inner diameter of the second component 8 is the outside diameter of the internal toothing 10 of the second component 8.

The term "slightly smaller" means in relation to the outside diameter 12 of the friction rings 11 that said outside diameter 12 is smaller by a maximum of 2%, in particular a maximum of 1%, than the said inner diameter of the second component 8.

The friction rings 11 thus rest either on the second component 8 or are only slightly spaced apart from said second component 8.

An inner diameter 14 (FIG. 3) of the friction rings 11 is dimensioned so that the friction rings 11 in any case do not bear against the surface of the first component 5. In particular, the inner diameter 14 of the friction rings 11 can be at least 5%, in particular at least 7%, greater than the outside diameter of the first component 5, i.e. in the specific example embodiment of the friction assembly 1 according to FIG. 1 than the outside diameter of the external toothing 7 of the first component 5.

The friction rings 11 can thus be arranged guided in the friction assembly 1, and they are arranged to be freely rotating in any case, i.e. they do not have a rotationally secure connection to the first component 5 or a rotationally secure connection to the second component 8 of the friction assembly 1. Furthermore, they are not connected in a rotationally secure manner to the inner discs 2 and the outer discs 3.

As already known, the inner discs 2 can be adjusted relative to the outer discs 3 or the outer discs 3 can be adjusted relative to the inner discs 2 in axial direction so that surfaces 15 of the inner discs 2 and surfaces 16 of the outer discs 3 come into contact with the friction rings 11 and thus in the closed position of the coupling for the torque transmission from the first component 5 to the second component 8 of the friction assembly 1—or vice versa—form a frictional connection with the friction rings 11. (In the configuration of the friction assembly 1 as a brake the frictional connection is formed between the discs and the friction rings 11 in a similar manner.)

Figure 2:
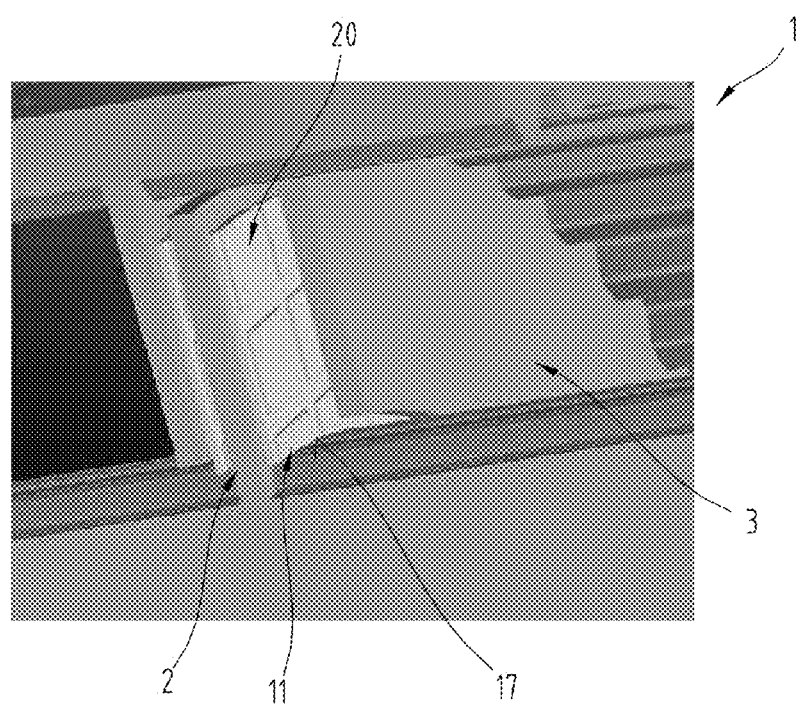
FIG. 2 shows a section of a friction assembly with internal guiding in an oblique view.

FIG. 2 shows a further and possibly independent embodiment of the friction assembly 1, wherein the same reference numerals or component names are used for the same parts as in FIG. 1. To avoid unnecessary repetition, reference is made to the detailed description of FIG. 1.

The friction assembly 1 according to FIG. 2 is essentially identical to the one according to FIG. 1, the difference being that the friction rings 11 are not externally guided but are internally guided, i.e. are arranged internally centered in the friction assembly 1 between the inner discs 2 and the outer discs 3. In addition, the inner diameter 14 (FIG. 3) of the friction rings 11 is the same size or only slightly greater than the outside diameter of the first component 5 in the region of a radially inner end face 17 of the friction rings 11. In a specific example embodiment of the friction assembly 1 according to FIG. 2 said outside diameter of the first component 5 is the outside diameter of the external toothing 7 of the first component 5.

The term "slightly greater" is used with reference to the inner diameter 14 of the friction rings 11 to mean that said inner diameter 14 is greater by a maximum of 2%, in particular a maximum of 1%, than the said outside diameter of the first component 5.

The friction rings 11 thus lie on the first component 5 or are only slightly spaced apart from the said first component 5.

The outside diameter 12 (FIG. 3) of the friction rings 11 is dimensioned so that the friction rings 11 do not bear against the surface of the second component 8. In particular, the outside diameter 12 of the friction rings 11 can be at least 5%, in particular at least 7%, smaller than the inner diameter of the second component 8 (internal width of the second component 8), i.e. in the specific example embodiment of the friction assembly 1 according to FIG. 2 than the outside diameter of the internal toothing 10 of the second component 8.

FIG. 3 shows an embodiment variant of a friction ring 11 according to the invention.

The friction ring 11 is designed in one piece, i.e. in particular so that it does not have a separate support element on which friction linings are arranged.

The friction ring 11 comprises a matrix containing at least one additive which is in particular distributed at least almost homogenously. The term "at least almost homogenously" means that in some areas it is possible to have differences in concentrations on the individual components which are as result of the industrial production process.

However, it is also possible for at least one additive to be deliberately distributed non-homogenously in order to thereby adapt the property profile of the friction ring 11 to the respective purpose. In the preferred embodiment variant of the friction ring 11 however the latter has an at least almost homogenous distribution of the at least one additive in the matrix.

The matrix of the friction ring 11 is preferably formed by a resin. The resin can be a phenolic resin, a phenolic/formaldehyde resin, an epoxy resin, a melamine resin, a cyanate resin, a silicone resin, etc. or a resin mix can be used for example. In particular, a heat-resistant resin can be used with a heat resistance of at least 200° C., for example an epoxy resin with a heat resistance of 200° C. or a silicone-like resin with a heat resistance of 270° C.

The resin is used as a bonding agent in order to hold together the particles or fibers of the at least one additive and bind them into the friction ring 11.

The proportion of resin on the friction ring 11 can be between 15 wt. % and 85 wt. %, in particular between 40 wt. % and 75 wt. %.

The at least one additive can be formed by a fiber material, such as for example paper fiber, carbon fiber, aramid fiber, etc. In particular, the at least one fiber material is impregnated with the resin.

If paper is used as the fiber material, the latter preferably has a grammage which is selected from a range with a lower limit of 260 g/m$^2$ and an upper limit of 1,400 g/m$^2$.

Of course, also various standard adjuvants and processing aids can be included in the matrix.

If necessary, the friction rings 11, i.e. the matrix, can also contain abrasive particles such as e.g. $SiO_2$, $Al_2O_3$, etc. The abrasive particles preferably have an average size of between 10 μm and 100 μm, as in this way the compression of the friction ring 11 can be influenced.

In particular, the abrasive particles can be added in an amount which is selected from a range with a lower limit of 2 wt. % and an upper limit of 20 wt. %, preferably from a range with a lower limit of 5 wt. % and an upper limit of 10 wt. %.

All of the details regarding the composition of the friction ring 11 or the friction rings 11—preferably all of the friction rings 11 in the friction assembly 1 have the same structure and are assembled in the same way—are relative to the total weight of the friction ring 11.

In addition, to the configuration of the friction ring 11 as a composite material with a resin matrix the friction ring 11 can also be made from a sintered material, for example with a metal matrix of copper, in which if necessary at least one further metal can be included, such as for example iron, or another additive, such as e.g. silicon, a silicate additive, selected in particular from a group comprising mica, feldspar, diatomaceous earth, mullite, silicon dioxide, solid lubricants, such as e.g. graphite, $MoS_2$, etc., hard particles such as corundum, glass, aluminum oxide ($Al_2O_3$), as well as mixtures thereof.

The proportion of the at least one additive in the sintered friction ring can be selected from a range with a lower limit of 5 wt. % and an upper limit of 35 wt. %. The remainder is formed by the matrix.

The friction ring 11 has on a surface 18, which in the friction assembly 1 faces the adjacent inner disc 2, and on a surface 19, which in the friction assembly 1 faces the adjacent outer disc 3, at least one compacted area 20 and at least one non-compacted area respectively or a less compacted area 21 compared to the compacted area 20.

If only one compacted area 20 is formed for each surface 18, 19 of the friction ring 11 the latter can be for example circular and thus separate the non-compacted or less compacted areas 21 of a surface 18, 19.

In the preferred embodiment variant of the friction ring 11 however a plurality of compacted areas 20 are formed, distributed evenly in particular over the surfaces 18, 19, as shown for example in FIG. 3.

The less compacted areas 21 can have a density for example which is 10% to 90%, in particular 20% to 70%, lower than the density of the compacted areas 20. For example the non-compacted areas 21 can have a density which is selected from a range with a lower limit of 0.9 g/cm$^3$ and an upper limit of 2.4 g/cm$^3$, in particular selected from a range with a lower limit of 1.2 g/cm$^3$ and an upper limit of 2.2 g/cm$^3$.

The compacted areas 20 can have a density for example, which is selected from a range with a lower limit of 3 g/cm$^3$ and an upper limit of 8 g/cm$^3$, in particular selected from a range with a lower limit of 4 g/cm$^3$ and an upper limit of 7 g/cm$^3$.

The non-compacted or less compacted areas 21 can be square—as viewed in a plan view of the surfaces 18, 19—as shown in FIGS. 1 and 2, or trapezoidal, as shown in FIG. 3. However, other configurations are possible, as shown in FIG. 4, which shows a plurality of different embodiments of the friction ring 11. For example, the non-compacted or less compacted areas 21 can be at least approximately elliptical, at least approximately circular, hexagonal or octagonal or generally polygonal. It is also possible for the non-compacted or less compacted areas 21 to be circular (not shown).

On the formation of a waffle pattern with square compacted areas 20, as shown in FIGS. 1 and 2, it is preferable if the edge lengths of the square are a maximum of 4 mm, for example 0.75 mm, as in this way the stability of the friction ring 11 can be improved.

Preferably, the non-compacted or less compacted areas 21 on both surfaces 18, 19 of the friction ring 11 have the same shape. It is also possible however to design the non-compacted or less compacted areas 21 differently on the surface 18 than on the surface 19, for example with a different geometry and/or different size.

As shown in particular in FIG. 3 at least individual, preferably all or a plurality, i.e. more than 50%, in particular more than 60%, of the non-compacted or less compacted areas 21 can be surrounded annularly by the compacted areas 20, so that the non-compacted or less compacted areas 21 are only arranged in discrete areas on the surfaces 18, 19 of the friction ring 11. However, as shown in FIG. 4 if the non-compacted or less compacted areas 21 to the end faces 13, 17 of the friction ring 11 are arranged extending to the radially outer edge and/or to the radially inner edge of the friction ring 11, said non-compacted or less compacted areas 21 are of course not surrounded completely and enclosed by the compacted areas 20.

According to a preferred embodiment variant it is also possible for the non-compacted or less compacted areas 21 to each have an area of a maximum of 2 cm$^2$, in particular a maximum of 1.6 cm$^2$. In this case all non-compacted or less compacted areas 21 on a surface 18, 19 can be same size, or as shown for example in FIG. 3, the non-compacted or less compacted areas 21 of a surface 18, 19 can have a different area expansion, for example get smaller from the radial outer end face 13 in the direction of the radial inner end face 17 of the friction ring 11.

It should be mentioned at this point that it is possible within the scope of the invention to provide both non-compacted areas 21 and areas 21 that are less compacted compared to the compacted areas 20 on at least one of the surfaces 18, 19, preferably on both, adjacent to the compacted areas 20 in order to adjust the compressibility of the friction ring 11 to a desired degree.

The compacted areas 20 can be designed to be at least approximately planar, in particular in a plane, with the non-compacted or less compacted areas 21. In addition, in the areas of the surfaces 18, 19 of the friction ring 11 in which the compacted areas 20 are to be formed, there can be more material so that when compacting said areas a planar design can be achieved.

In the preferred embodiment variant of the friction ring 11 the compacted areas 20 can be depressed relative to the non-compacted or less compacted areas 21, in particular are groove-like, as shown for example in FIG. 5. The grooves 22 in the surfaces 18, 19 of the friction ring 11 can be formed by a suitable press tool, wherein the friction ring 11 is compressed between two press punches which have webs at the points where the compacted areas 20 are to be formed, which webs are pushed into the friction ring 11 and thus produce the compaction. In principle however, other methods of producing the grooves 22 are possible. For example, the latter can be produced by means of machining methods, e.g. cutting.

FIG. 5 shows two embodiment variants of the friction ring 11. On the left part of FIG. 5 the grooves 22, i.e. the compacted areas 20, are arranged exactly opposite one another in the surfaces 18, 19, i.e. are congruent. On the right part of FIG. 5 the grooves 22 in the surface 18 are arranged offset in circumferential direction of the friction ring 11 relative to the grooves 22 in the surface 19 so that the grooves 22 no longer overlap exactly. With the latter embodiment variant it is possible that the compacted areas 20 also support the non-compacted or less compacted areas 21 when closing the friction assembly 1. In this way, the compressibility of the friction ring 11 can be adjusted, as by offsetting the compacted areas 20 locally different densities can be produced. The offset can be selected for example from a range of 5% to 50% of the extension of the respective non-compacted or less compacted area 21 adjoining the compacted area 20 in circumferential direction.

The embodiment variants of the friction ring 11 according to FIG. 5 are not only possible with the grooves 22 as compacted areas 20 but are considered in general as the compacted areas 20, i.e. even if the compacted areas 20 are designed to be at least approximately to be planar or in a plane with the non-compacted or less compacted areas 21, as explained above.

FIG. 6 shows further embodiment variants of the friction ring 11. The friction ring 11 consists in addition to the matrix of at least one additive, as already explained above. Said additive or at least one of the additives can be formed by fibers 23, for example carbon fibers or cellulose fibers, wherein in the latter case the additive or at least one of the additives is preferably paper, as usually used in friction linings. It is possible for at least 50% of the fibers 23, in particular at least 70% of the fibers 23, relative to the total amount of fibers 23 in the friction ring 11, to be oriented in the same direction at least approximately. This orientation of the fibers 23 depending on the setting of the desired mechanical properties of the friction ring 11 can be for example in radial direction or in circumferential direction or linearly in the direction of a tangent or wave-like, as shown in. FIG. 6. It is also possible that the fibers 23 are oriented in several directions at least approximately in the same direction, wherein a first proportion of the fibers 23 are oriented in one direction and a second proportion of the fibers 23 are oriented in another direction. It is thus also possible that the proportion of fibers 23 are oriented differently in the area of the surface 18 of the friction ring 11 than the proportion of fibers 23 in the region of the surface 19.

FIG. 6 shows a further embodiment variant of the friction ring 11, in which the at least one additive or at least one of the additives is formed by a wire-like reinforcing element 24, which is arranged in the region of the radial outer end face 13 and/or in the region of the radial inner end face 17 of the friction ring 11. The reinforcing element 24 or the reinforcing elements 24 can be arranged in the end face 13 and/or 17 or slightly spaced apart from the latter. The term "slightly" means that the reinforcing element 24 is arranged at a distance from the respective end face 13, 17 which corresponds to a maximum of 10%, in particular a maximum of 5%, of the outside diameter 12 (FIG. 3) of the friction ring 11 in the case of the radially outer reinforcing element 24 and which corresponds to a maximum of 10%, in particular maximum of 5%, of the inner diameter 14 of the friction ring 11 in the case of the radially inner reinforcing element 24.

As shown in FIG. 7, according to another embodiment variant of the friction assembly 1 for adjusting the compressibility at least two friction rings 11 are arranged respectively between the inner discs 2 and the outer discs 3, wherein the friction rings 11 are connected to one another, for example are adhered to one another.

The friction ring 11 can be designed to be planar—apart from the grooves 22. It is also possible according to a further embodiment variant of the friction ring 11 to deliberately design the latter to be wave-like, as shown in FIG. 8. A maximum depth 25 of the shaft waves can be selected from a range of 1% to 80%, in particular from a range of 20% to 70%, of a thickness 26 of the friction ring 11.

It is also possible that the wave form in relation to the outside diameter 12 of the friction ring 11 is not greater than 5%, in particular not greater than 4%. The wave form can be made in the friction ring 11, for example during the hardening process of the resin which is used for the friction ring 11.

In all of the embodiment variants of the friction ring 11 the thickness 26 can be selected from a range of 0.25 mm to 1.75 mm, in particular from a range of 0.4 mm to 1.5 mm.

Although the one-piece embodiment of the friction ring 11 is preferred, according to further embodiment variant of the friction ring 11 shown in FIG. 9 it is possible for the friction rings 11 to be formed by a support ring 27 and friction segments 28 arranged thereon, the support ring 27 being made from a resin-impregnated paper. The friction segments 28 also consist of at least one resin as a matrix, containing at least one additive, as explained above, and are connected to the support ring 27. The support ring 27 and friction segments 28 can be joined together by the at least one resin, wherein preferably the same resin is used for the support ring 27 and the friction segments 28.

The friction segments 28 can be designed with respect to their form and size according to the non-compacted or less compacted areas 21, as explained above. However, it is also possible for the friction segments 28 to have more than one non-compacted or less compacted area 21.

The compacted areas 20 are preferably formed by the support ring 27. However, it is also possible for the compacted areas 20 to be formed on the friction segments 28.

In all of the embodiment variants of the friction ring 11 at least the non-compacted or less compacted areas 21 have a porosity which is at least 20% and a maximum of 80%, in particular at least 40% and a maximum of 80%. It is thus also possible that the compacted areas 20 have this porosity. The porosity is defined here as the ratio of the total density of the material of the friction ring 11 to its actual density. By means of the porosity it is possible to influence the lubricant take up of the friction ring 11 and the lubricant guiding and thereby the cooling of the friction ring 11.

It should be mentioned that in the preferred embodiment variant of the friction assembly 1 the friction ring 11 is wet-running, i.e. is wetted with a lubricant.

It is also preferred in all of the embodiment variants of the friction ring 11 if the ratio of the outside diameter 12 to the inner diameter 14 of the friction ring 11 is at least 1.2, in particular at least 1.5.

In addition or alternatively to this it is preferable if in all of the embodiment variants of the friction ring lithe surface 18 and/or surface 19 at least in the non-compacted or less compacted areas 21 has or have an arithmetic average roughness value Ra according to DIN EN ISO 4287:1998 of a maximum of 12.5 µm, in particular a maximum of 9.8 µm.

In the case of the internal centering of the friction rings 11 in the friction assembly 1, as shown in FIG. 2, it is an advantage, if the friction rings 11 are arranged at a distance between the radially outer surface of the first component 5, in particular the shaft, which is at least 0.05 mm and a maximum of 3 mm.

If a resin is used as the matrix of the friction ring 11 the latter can also be carbonized.

Preferably, the composition of the friction ring 11 is selected so that the latter has a thermal conductivity which at 20° C. is at least 0.1 W/mK, in particular at least 0.5 W/mK, preferably at least 2 W/mK. Said thermal conductivity can be achieved by using at least one metal material and/or carbon fibers, but also by having a suitably high density of the friction ring 11 at least in the compacted areas 20, possibly also in the non-compacted or less compacted areas 21. An example composition comprises 35 wt. % to 45 wt. % cotton, 10 wt. % to 15 wt. % graphite, 10 wt. % to 15 wt. % glass fibers, 10 wt. % to 15 wt. % carbon fibers, 5 wt. % to 15 wt. % latex and 5 wt. % to 8 wt. % calcium silicate.

For high thermal conductivity it is an advantage if the proportion of graphite and/or carbon fibers is set to be greater. Furthermore, for low thermal conductivity it is an advantage if the proportion of cotton fibers is low and the proportion of glass fibers and/or carbon fibers is greater.

Preferably, the friction ring 11 has a thermal expansion in the range of −1.0 E-6 to −5.0 E-6 1/K at temperatures in the range of 100° C. to 200° C. This can be achieved e.g. by using carbon fibers as at least one additive. An example composition comprises 15 wt. % to 25 wt. % cotton, 10 wt. % to 15 wt. % graphite, 20 wt. % to 25 wt. % glass fibers, 20 wt. % to 25 wt. % carbon fibers, 5 wt. % to 15 wt. % latex and 5 wt. % to 8 wt. % calcium silicate.

In this way the friction ring 11 cannot expand or cannot expand much with an increase in temperature. The friction ring 11 can be guided outwardly (FIG. 1) or inwardly (FIG. 2) according to the use. To ensure that the friction ring 11 does not produce a walking movement during the rotation, it is an advantage if the friction ring 11 has no play or as little play as possible, as explained above. If because of the temperature the expansion is greater than the tolerance level it can result in the destruction of the friction ring 11. This can be prevented by means of the preferred thermal expansion of the friction ring 11.

It is also preferable in all of the embodiment variants if the Poisson ratio, i.e. the relative expansion of the friction ring 11 during pressure loading in radial direction, is not greater than 0.1 to 0.3, in particular is not greater than 0.2. In this way it is possible to prevent that because of the pressure acting on the friction ring 11 when closing the friction assembly 1 the expansion being greater than the tolerance. This can prevent the destruction of the friction ring 11. The Poisson ratio can be determined according to DIN 51909 (1998) or DIN 51045 or DIN EN 821-1 (1995) or DIN V ENV 1159-1 (1993).

Preferably, the friction ring 11 has the same tribological behavior on both surfaces 18, 19.

The friction ring 11 is preferably used in applications in which
the maximum pressure is not greater than 10 N/mm$^2$,
the sliding speed is not greater than 50 m/s,
the energy per gearshift is not greater than 5 J/mm$^2$. The details regarding area relate to the gross surface area.

The friction assembly 1 with the friction rings 11 has at least in most embodiment variants the advantage that friction linings do not need to be adhered separately onto a metal carrier. In this way shorter production times can be achieved, as the steps of staining, applying adhesive, prepositioning the carrier are unnecessary. In this way the time required for hardening can also be reduced. Usually the inner discs 2 are used as the carrier. As the latter (like the outer discs 3) no longer have friction linings the carriers can also be used as a heat sink, as there is no lining insulation. In this way it is possible to achieve greater output density or with the same output density as in the prior art with adhered friction linings it is possible to use less installation space.

Figure 10:
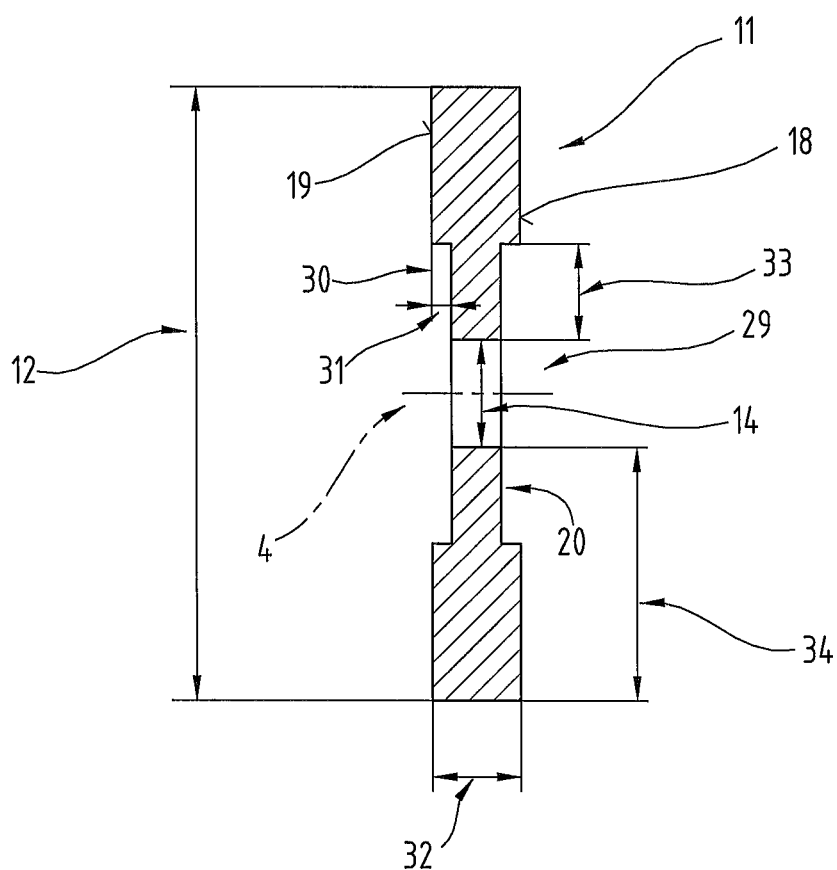
FIG. 10 shows a further embodiment variant of the friction ring in lateral cross section.
Figure 11:
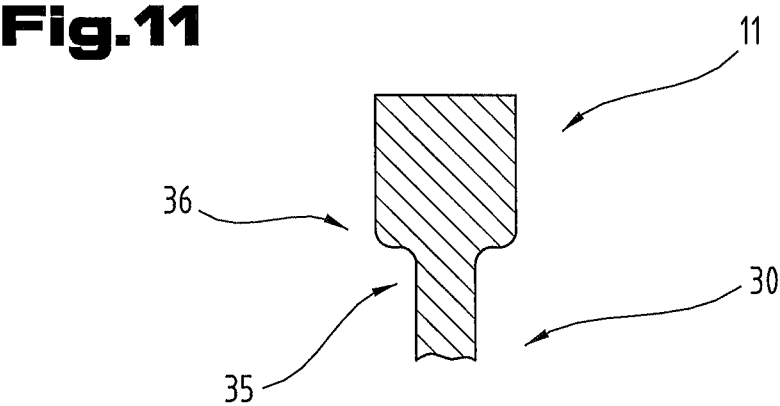
FIG. 11 shows a section of an embodiment variant of the friction ring according to FIG. 9 in lateral cross section.

FIGS. 10 and 11 show additional and possibly independent embodiments of the friction assembly 1, i.e. the friction ring 11 of the friction assembly 1, wherein the same reference numerals and components names are used for the same parts as in FIGS. 1 to 9. To avoid unnecessary repetition reference is made to the detailed description relating to FIGS. 1 to 9.

In this embodiment variant the friction ring 11 has a cross-sectional tapering 30 in the region of an opening 29, through which, as explained above, the first component 5 (FIG. 1) projects, i.e. in the region of the inner guide. Said cross-sectional tapering 30 is used principally for supplying a lubricant to the area of the inner guide of the friction ring 11.

Preferably, the cross-sectional tapering 30 is formed on both sides, i.e. on both surface 18 and on surface 19 of the friction ring 11. However, it is also possible for said cross-sectional tapering 30 to be formed in only one of the two surfaces 18, 19 of the friction ring 11. Said embodiment variant of the friction ring 11 can be used in particular if a plurality of friction rings 11 are arranged respectively between an inner disc 2 and an outer disc 3 (FIG. 1) and in particular are connected together.

Preferably, the cross-sectional tapering 30 in axial direction 4 has a width 31 which is between 1% and 30%, in particular between 4% and 20%, of a total width 32 of the friction ring 11 in axial direction 4.

It is also preferable if a height 33 of the cross-sectional tapering 30 in radial direction is between 1% and 20%, in particular between 5% and 15%, of a total height of the friction ring between the outside diameter 12 and the inner diameter 14 of the friction ring 11.

The cross-sectional tapering 30 extends along the circumference of the opening 29 preferably continuously and without interruption.

The cross-sectional tapering 30 can be formed by compacting this area, in particular if the friction ring 11 is made from at least one resin, containing at least one additive, or a sintered material, whereby the friction ring 11 can be made in one piece. In addition, in this way it is possible to achieve a mechanical improvement of the loadability of the friction ring 11 in the region of the inner guide through this compacted area 20 within the meaning of the above explanations relating to FIGS. 1 to 9.

As explained above, it is also possible for the friction ring 11 to consist of the support ring 27 with friction segments 28 arranged thereon. In this case it is possible that the support ring 27 has a thickness in axial direction which corresponds to the total width 32 of the friction ring 11 minus the width 31 of the cross-sectional tapering 30 or, if the friction ring 11 has cross-sectional taperings 30 on both sides, minus the widths 31 of the two cross-sectional taperings 30. The support ring 27 thus does not have any friction segments 28 in the region of the cross-sectional tapering 30.

However, it should be noted that it is also possible to design the friction ring 11 so that the friction segments 28 extend into the area of the cross-sectional tapering(s) 30 and the cross-sectional tapering(s) 30 are formed by a compacted area 20 of the friction segments 28.

According to another embodiment variant of the friction assembly 1, as also explained above, three friction rings 11 are arranged respectively between the inner discs 2 and the outer discs 3 (FIG. 1), the friction rings 11 being connected together. The opening 29 of the middle friction ring 11 can in this case have a smaller inner diameter to form the cross-sectional tapering 30 than the openings 29 of the two outer friction rings 11.

It should be noted here that it is also possible in this embodiment of the friction ring 11 that the two outer friction rings 11 extend up to the area of the cross-sectional tapering(s) 30 and the cross-sectional tapering(s) 30 are formed by a compacted area 20 of both outer friction rings 11. In this case the two outer friction rings 11 each preferably only have one compacted area 20 which is formed on the surface which does not fit on the middle friction ring 11. For example, in these embodiments of the friction assembly 1 (FIG. 1) all of the openings 29 can have the same inner diameter 14.

Furthermore, in the embodiment variant of the friction assembly 1 with a plurality of connected friction rings 11 it is possible that more than three friction rings 11 are provided and connected to one another. In this case the inner friction rings 11 between the two outer friction rings 11 each have an opening 29 of the same size. The cross-sectional tapering(s) 30 are thus formed by one or both outer friction rings 11. However, it is also possible to provide a plurality of friction rings 11 on at least one side (as viewed in axial direction 4) which have a smaller inner diameter 14 of the openings 29 than the middle friction ring or rings 11.

According to a development of the embodiment variant of the friction ring 11 according to FIG. 10 it is possible that at least one transition between two different cross-sections of the friction ring 11 in the region of the cross-sectional tapering 30 is provided with at least one rounding 35 and/or 36, as shown in FIG. 11.

A radius of the rounding 35 and/or a radius of the rounding 36 can thus be selected from a range with a lower limit of 0.1 mm and an upper limit of 1.2 mm.

Furthermore, reference is made to the explanations relating to the friction ring 11 according to FIG. 9 and the associated embodiments relating to the support ring 27 with the friction segments 28 or the connected friction rings 11, which can also be applied to this embodiment variant of the friction ring according to FIG. 10.

The explanations relating to the inner guiding of the friction rings 11 can be applied to the embodiment variant of the friction assembly 1 with externally guided friction rings 11. It is thus also possible with the externally guided friction rings 11 to provide such cross-sectional taperings 30 and possibly at least one rounding 35 and/or 36. To avoid repetition reference is therefore made to the above explanations relating to FIGS. 10 and 11.

It is also possible to select a mixed variant with an internal and external guide, wherein a portion of the friction rings 11 are guided internally and the remaining portion of the friction rings are guided externally. In this way a compromise can be achieved between the efficiency and performance of the friction assembly 1.

To produce the friction rings 11 a suitable mixture of raw materials can be applied with the resin onto paper and the latter can thus be impregnated with the resin, after which the resin is hardened. Afterwards, the friction rings 11 are punched out. The compacted areas 20 are preferably formed in the hardened resin. The hardening is a hot-pressing process, in which by means of temperature and pressure in the friction material the remaining cross-links of the resin can be formed and the final thickness adjusted. In this case there is a material flow, i.e. the outside diameter becomes greater, the inner diameter becomes smaller. Performing the hardening prior to punching has the advantage that the size of the friction rings 11 is no longer changed by subsequent processing steps. This has the advantage that both the strength and also the compressibility of the friction ring 11 can be better adjusted over the compacted areas 20 and the non-compacted or less compacted areas 21.

During the testing of the friction rings 11 the latter were compared with friction rings from the prior art which had no compacted and also less or non-compacted areas. In addition, in a friction testing machine the frictional value was recorded over the frictional period. The testing was performed on a friction assembly 1 which had six friction rings 11, four outer discs 3 and three inner discs 2. The friction rings 11 of the friction assembly 1 according to the invention and the friction rings of the friction assembly according to the prior art were made respectively from the same material, like the respective counter discs in the friction assemblies.

The frictional surface of said friction assemblies was 6,268.44 mm$^2$. The radius of the friction rings 11 was 58.72 mm. The friction rings 11 were guided externally according to the above explanations.

The friction assembly according to the prior art was assembled in an identical manner with regard to said data.

The test was performed with a wet-running friction assembly 1, the oil temperature being 100° C. A test cycle lasted 40 seconds, whereby 50 cycles were performed in each round. The pressing force was 1.56 N/mm$^2$, the speed of the clutch engagement was 12 m/s.

The result of the test is shown in FIGS. 12 and 13. In the latter the frictional value or the temperature of the respective counter disc of the friction rings is entered in ° C. on the y-axis and the frictional period in seconds is entered on the x-axis.

The upper curve 37 in FIG. 12 shows the result of the friction assembly 1 with the friction rings 11 according to the invention. As shown in this representation the friction rings 11 according to the invention have better values with respect to the frictional values than a friction assembly with friction rings according to the prior art (bottom curve 38). In FIG. 13 however the lower curve 39 represents the result of the test on the friction assembly 1 with the friction rings 11 according to the invention. It can be seen clearly that the counter discs in the friction assembly 1 according to the invention are heated to a lesser degree than those in the friction assembly according to the prior art (upper curve 40 in FIG. 13).

Figure 14:
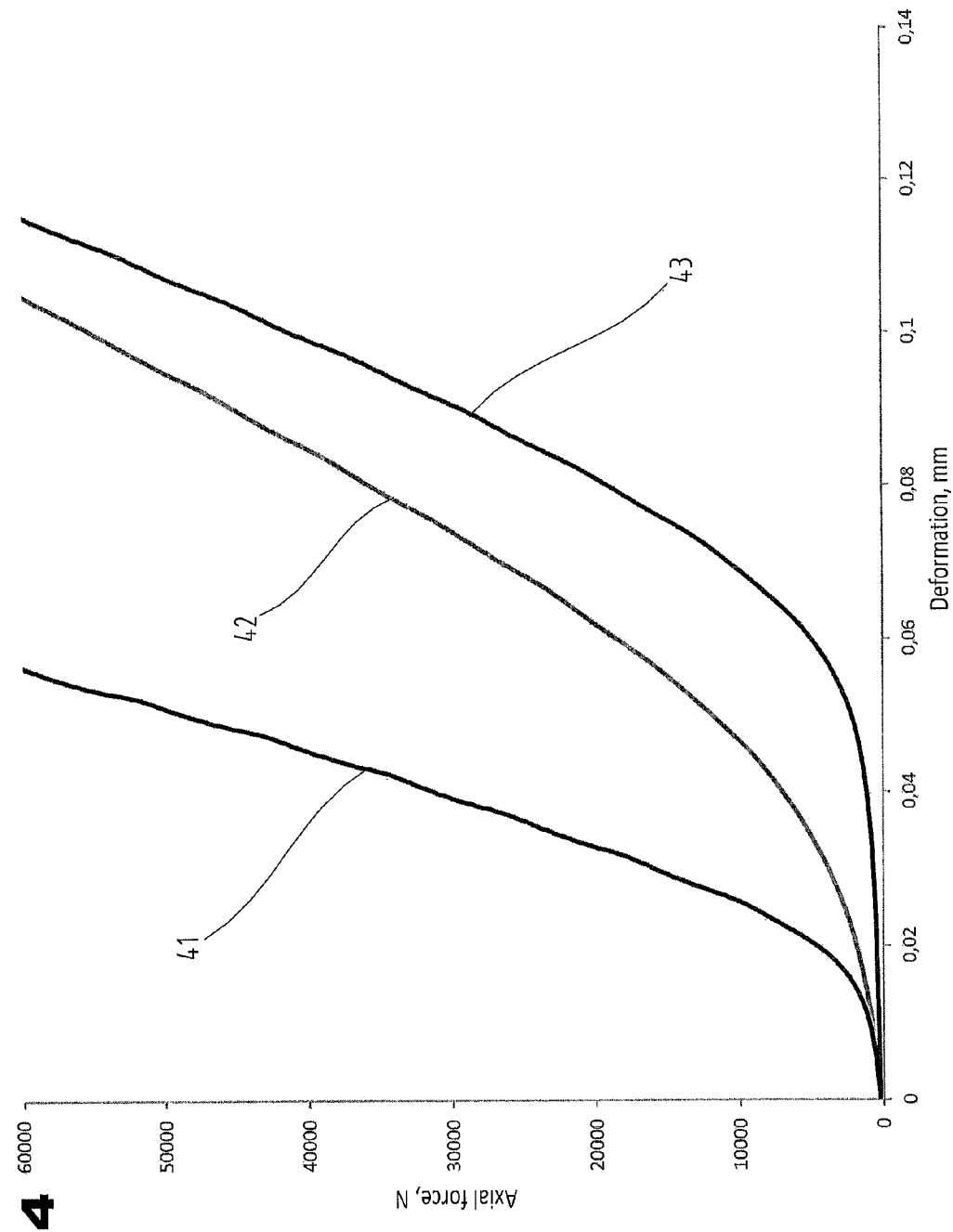
FIG. 14 shows the influence of the compacted areas in friction rings on their adaptability to the surface of the counter disc.

The measurement for FIG. 14 was performed using a Zwick testing machine MPM T1-FR 250 SN A4K. An externally guided friction ring 11 was used as a test piece. A simple pressure test was performed. The testing machine was operated at a minimum force of 250 N and then at a constant speed of 1 mm/minute the friction ring 11 was compressed until the maximum force 62.8 kN was reached (corresponds to 10 N/mm$^2$). The result is shown in FIG. 14, in which the axial force in N is represented on the y-axis and the deformation in mm is represented on the x-axis. The left curve 41 shows the result of a friction ring from the prior art without compacted areas, the middle curve 42 shows a friction ring 11 according to the invention with compacted areas 20 that are exactly opposite one another in axial direction and the right curve 43 shows a friction ring 11 according to the invention with compacted areas 20 arranged offset on both surfaces 17, 18 in circumferential direction according to the above explanations. All of the friction rings were made from the same material. It is clearly shown that by means of the friction rings 11 according to the invention because of the greater deformability at a given axial force it is possible to achieve a better adjustment to the respective counter disc.

The example embodiments show possible embodiment variants of the friction assembly 1 or the friction ring 11, whereby it should be noted at this point that various different combinations of the individual embodiment variants are also possible.

The invention also comprises a friction assembly comprising a first component and a second component as well as a plurality of inner discs and a plurality of outer discs, the inner discs being arranged on the first component and the outer discs being arranged on the second component and the inner discs and the outer discs being arranged alternately in axial direction, and wherein between the inner discs and the outer discs respectively at least one freely rotatable friction ring is arranged which has an opening with an inner diameter, and wherein the inner discs and/or the outer discs can be adjusted relative to one another to form a frictional connection to the friction rings in axial direction, and wherein the freely rotating friction rings are guided in the area of the inner diameter on the first component.

By means of the inner guide of the friction rings compared to the external guide a greater degree of efficiency can be achieved for the friction assembly. Surprisingly, under otherwise identical conditions, internally guided friction rings have a greater frictional value over the number of shift cycles than outwardly guided friction rings. However, this has the disadvantage that the inwardly guided friction rings heat up more than outwardly guided friction rings. Furthermore, it was possible to establish that with inwardly guided friction rings the drag torque can be reduced significantly compared to outwardly guided friction rings so that the power loss can be significantly reduced with the friction assembly according to the invention.

According to a further embodiment variant of the friction assembly the friction rings can have a cross-sectional tapering in the region of the opening. Thus in the region of the guide of the friction rings at least one lubricant pocket can be provided, whereby in this area better cooling of the friction rings is possible and thus overheating can be avoided more effectively in the region of the guide. The friction rings are thus better protected from damage, for example as a result of walking movements.

In order to improve the guiding of lubricant in this area it is possible for a transition between two different cross-sections in the area of the cross-sectional tapering to be provided with at least with one rounding.

In addition, it is possible for the friction rings to be made from at least one resin containing at least one additive or a sintered material, and the cross-sectional tapering to be formed by a compacted area. It is an advantage that the friction ring also has a greater mechanical strength over the compacted area. This advantage outweighs the disadvantage associated therewith that the area of the friction ring mainly available for the frictional connection, i.e. the area that is not compacted or is less compacted, is reduced. A positive secondary effect of this is that it is possible to adjust the compressibility of the friction ring more easily, whereby the frictional behavior of the friction rings can be better adapted to the respective counter disc. By means of its improved mechanical stability the friction ring can have a long lifetime. It is also an advantage that the friction ring can be produced to have a relatively high strength from only one material, whereby the friction ring can be produced more easily accordingly, as the production method comprises fewer steps. By using only one material the homogeneity of the friction ring over its whole volume, i.e. the homogenous distribution of the individual components of the material, can be improved. This in turn has a positive effect on the frictional behavior of the friction ring. By using only one material there is also no risk that if the frictional surface were to wear away the counter disc would enter into frictional contact with a metal support, which would damage the counter disc.

According to another embodiment variant of the friction assembly the friction rings can be formed by a support ring and friction segments arranged thereon, whereby the support ring has a thickness in axial direction which corresponds to the thickness of the cross-sectional tapering. In this way the cross-sectional tapering can be produced easily and without subsequently machining the friction ring. In addition, in this way it is possible to advantageously reduce the cost, in that the expensive friction segments do not need to be produced in one piece, whereby the amount of waste produced with one-piece friction rings can be reduced. The friction rings thus consists of a supporting structure, namely the support ring, and a frictional structure, namely the friction segments.

In a special embodiment variant of the friction assembly three connected friction rings can be arranged between the inner discs and the outer discs, wherein the opening of the middle friction ring to form the cross-sectional tapering has a smaller inner diameter than the openings of the two outer friction rings. As in the embodiment variant of the friction assembly with the support ring described above, in this embodiment variant the cross-sectional tapering can also be produced easily in the region of the inner guide without subsequent expensive mechanical machining.

Lastly, it should also be noted that for a better understanding of the structure of the friction assembly 1 or the friction ring 11 the latter and its components have in part not been illustrated to scale and/or have been enlarged and/or reduced in size.

LIST OF REFERENCE NUMERALS

1 friction assembly
2 inner disc
3 outer disc
4 direction
5 component
6 internal toothing
7 external toothing
8 component
9 external toothing
10 internal toothing
11 friction ring
12 outside diameter
13 end face
14 inner diameter
15 surface
16 surface
17 end face
18 surface
19 surface
20 area
21 area
22 groove
23 fiber
24 reinforcing element
25 depth
26 thickness
27 support ring
28 friction segment
29 opening
30 cross-sectional tapering
31 width
32 total width
33 height
34 total height
35 rounding
36 rounding
37 curve
38 curve
39 curve
40 curve
41 curve
42 curve
43 curve

The invention claimed is:

1. A friction assembly (1) comprising a plurality of inner discs (2) and a plurality of outer discs (3), the inner discs (2) and the outer discs (3) being arranged alternately in an axial direction (4), and between the inner discs (2) and the outer discs (3) respectively at least one freely rotational friction ring (11) is arranged, and at least one of the inner discs (2) and the outer discs (3) are adjustable relative to one another in the axial direction (4) to form a frictional connection with the friction rings (11), wherein the friction rings (11) consist of at least one resin, containing at least one additive, wherein the friction rings (11) on a surface (19) facing an inner disc (2) and on a surface (18) facing an outer disc (3) each have a plurality of compacted areas (20) and at least one of a plurality of non-compacted areas (21) and a plurality of areas (21) compacted less than the compacted area (20), wherein at least individual compacted areas (20) annularly surround less compacted areas or non-compacted areas (21).

2. The friction assembly (1) as claimed in claim 1, wherein the compacted areas (20) are designed to be groove-like.

3. The friction assembly (1) as claimed in claim 1, wherein at least the non-compacted or less compacted areas (21) have a porosity, which is at least 20% and a maximum of 80%.

4. The friction assembly (1) as claimed in claim 1, wherein the at least one compacted area (20) on the surface (18) facing the outer disc (3) is offset in circumferential direction of the friction ring (11) relative to at least one compacted area (20) on the surface (19) facing the inner disc (2).

5. The friction assembly (1) as claimed in claim 1, wherein the at least one additive or at least one of the additives is formed by fibers (23), wherein at least 50% of the fibers (22), relative to the total amount of fibers (23) in the friction ring (11), are oriented at least approximately in the same direction.

6. The friction assembly (1) as claimed in claim 1, wherein between the inner discs (2) and the outer discs (3) respectively at least two friction rings (11) are arranged, the friction rings (11) being joined together.

7. The friction assembly (1) as claimed in claim 1, wherein the at least one additive or at least one of the additives is formed by a wire-like reinforcing element (24), which is arranged in at least one of the region of a radially outer end face (13) and the area of a radially inner end face (17) of the friction ring (11).

8. The friction assembly (1) as claimed in claim 1, wherein the friction ring (11) is designed to be wave-like.

9. The friction assembly (1) as claimed in claim 1, wherein the friction ring (11) has a thickness (26) in the axial direction (4) which is selected from a range of 0.25 mm to 1.75 mm.

10. The friction assembly (1) as claimed in claim 1, wherein the areas (12) that are not compacted or are less compacted each have an area of a maximum of 2 cm$^2$.

11. The friction assembly (1) as claimed in claim 1, wherein the ratio of an outside diameter (12) of the friction ring (11) to an inner diameter (14) of the friction ring (11) is at least 1.2.

12. The friction assembly (1) as claimed in claim 1, wherein the surface (18) facing the outer disc (3) and the surface (19) of the friction rings (11) facing the inner disc (2) at least in the region of the areas (21) that are not compacted or are less compacted have an arithmetic average roughness value Ra according to DIN EN ISO 4287:1998 of a maximum of 12.5 µm.

13. The friction assembly (1) as claimed in claim 1, wherein the friction rings (11) are guided internally on a shaft supporting the inner discs (2), the distance between a surface of the shaft and the friction rings (11) being at least 0.05 mm and a maximum of 3 mm.

14. The friction assembly (1) as claimed in claim 1, wherein the friction rings (11) are formed by a support ring (27) and friction segments (28) arranged thereon, the support ring (27) being made of paper.

* * * * *